Sept. 8, 1942.  W. R. YOUNG  2,295,317
ROUGHING TOOL
Filed Oct. 28, 1941
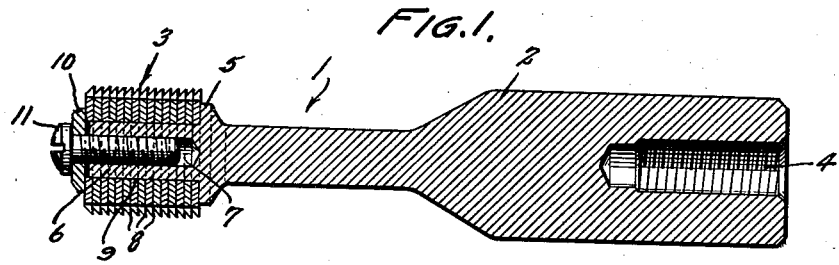
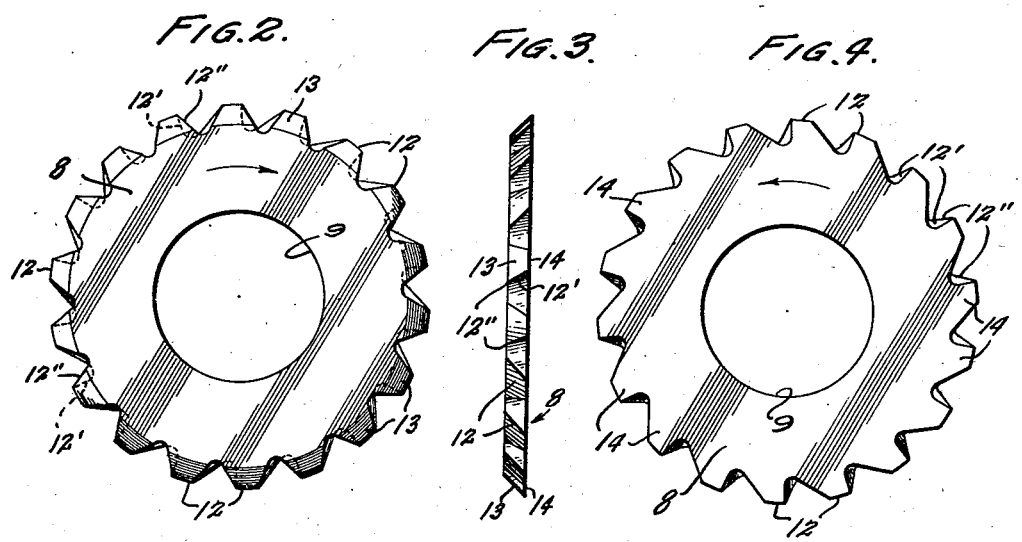
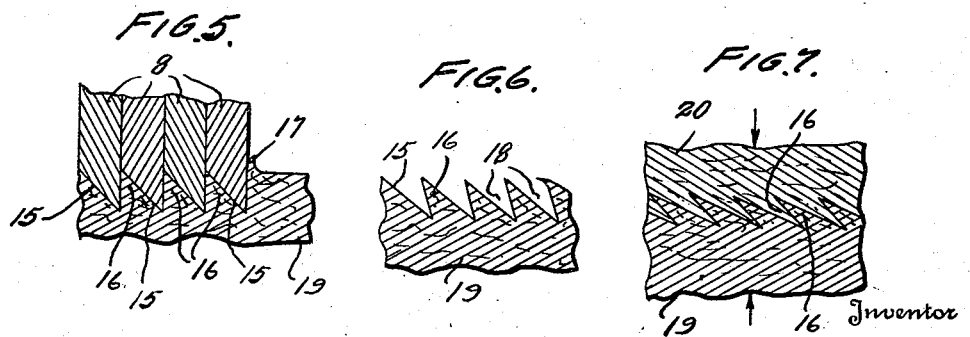
Inventor
WILBURN R. YOUNG
By Semmes, Keegin, Beale & Semmes
Attorneys Patented Sept. 8, 1942

2,295,317

UNITED STATES PATENT OFFICE 2,295,317

ROUGHING TOOL

Wilburn R. Young, Camden, Ark.

Application October 28, 1941, Serial No. 416,890

2 Claims. (Cl. 69—1)

This invention relates to shoe machinery and more particularly to a roughing tool designed for cutting grooves to assist in joining two pieces of leather together.

One of the objects of this invention is to provide a leather roughing tool composed of a plurality of cutters, the peripheries of which are serrated to form teeth designed for cutting grooves on the surface of a piece of leather.

Another object of this invention is to provide a roughing tool of the type described in which the teeth are designed to cut parallel buttress-shaped grooves in adjacent surfaces of leather to be joined whereby the two pieces of grooved leather may be joined with suitable adhesive by interlocking the two sets of grooves.

Still another object of this invention is to provide a roughing tool of the type described by means of which grooves may be formed without closing the pores of the leather.

A further object of this invention is to provide a roughing tool which may be attached directly to a shoe machine to cut buttress grooves in leather in such a manner that the perpendicular face of the groove will tend to overset toward the angular face to form in effect an undercut groove.

With these and other objects in view, this invention embraces broadly the concept of providing a roughing tool composed of a plurality of cutting discs, the peripheries of which are serrated to form teeth for the purpose of cutting grooves in the surface of a piece of leather or similar material. The roughing tool may be attached directly to a shoe machine under the suction hood so that the leather dust may be removed during the cutting operation.

The teeth are designed to cut buttress-shaped grooves in the surface of the leather without closing the pores of the material permitting better penetration of an adhesive. The overlapping lands, on joined pieces of leather cause the pieces to interlock under pressure, as in a glueing press, and thereby form a more secure union between the pieces.

This roughing tool is especially designed for shoe repair work to be used in forming grooves in both the shank of the shoe and the half sole. The presence of the grooves is advantageous because when interlocked they securely join the two pieces of leather together thereby facilitating the repairing process as will be subsequently disclosed.

In the drawing:

Figure 1 is a longitudinal sectional view of a roughing tool device constructed according to an embodiment of the present invention;

Figure 2 is a face view of the beveled side of one of the cutters which forms the roughing tool;

Figure 3 is an edge view of the cutter shown in Figure 2;

Figure 4 is a plan view of the reversed face of the cutter shown in Figure 2;

Figure 5 is a fragmental view in cross section disclosing a plurality of grooves being formed in a piece of leather by action of the roughing tool;

Figure 6 is a fragmental view in cross section of a piece of leather in which a plurality of buttress-shaped grooves have been formed;

Figure 7 is a fragmental view in cross section of two pieces of grooved leather, the grooves of which have been meshed.

As best shown in Figure 1, the roughing device generally indicated by the numeral 1 comprises an arbor 2, and a roughing tool 3. One extremity of the arbor 2 is provided with a threaded recess or socket 4 which is adapted to engage the threaded end of a drive spindle forming part of a shoe repair machine which is not shown. The opposite extremity of the arbor 2 is provided with a shoulder 5 and reduced shank portion 6 having a threaded recess or socket 7.

The roughing tool 3 comprises a plurality of circular discs 8 provided with centrally located apertures 9. These discs are coaxially mounted on the shank 6 and are held in abutting relation between the shoulder 5 and a washer 10 by means of a bolt or headed screw 11 which is removably mounted in the threaded recess 7. This construction permits replacement of individual cutters.

The periphery of each of the discs 8 is beveled on one face to form a sharp cutting edge and is serrated to form a plurality of teeth 12 having a beveled side 13 and a straight side 14. The entering edge of each tooth is ground to provide a back rake 12' to form a cutting edge 12'' on the beveled side of the tooth.

Any desired number of cutter discs may be placed on the arbor 2, usually a sufficient number are employed to groove the desired area of leather in a single operation.

In operation the surface of the leather to be grooved, usually the flesh side, is fed over the periphery of the rotating gang of cutter discs 8 and a series of parallel grooves cut therein. As an example, in half soling, the shank of the shoe from which the worn sole has been removed is thus grooved. The flush side of one end of the half sole is next grooved in a similar manner.

Adhesive is applied to the grooved areas and the two grooved surfaces are joined so that the grooves intermesh and are placed in a press until the adhesive sets.

By virtue of the cutting edge being on the beveled side of the teeth as described above and by reference to Figures 5, 6 and 7, it will be seen that the grooves are formed by the leather being cut clearly on the angular face of the grooves as indicated at 15.

The lands 16 between the cuts 15 are somewhat compressed and forced up into the angles between adjacent cutters by the rake of the teeth where they are trimmed by the beveled cutting edges of the teeth. This upturning is more graphically indicated at 17 in Figure 5.

After pressure of the cutter discs have been removed the somewhat compressed fibers of the lands 16 tend to assume their original position. This results in a series of undercut grooves 18 as shown in Figure 6.

When two pieces of leather 19 and 20 so treated are joined, as shown in Figure 7, so that their grooves mesh and are placed under pressure (as indicated by the arrows) the lands 16 interlock. This interlocking forms a union between the pieces and when adhesive is first applied to the grooved areas a firm bond will result.

The grooves form in effect a trap for the adhesive and when the joined pieces of leather are placed under pressure, prevents its flow outward and onto the upper of the shoe being repaired. Instead it is forced into the pores of the leather to fully utilize the inherent properties of the adhesive. Additionally, the interlocking surfaces provide a maximum of contact area between the joining faces of the leather.

Although for purposes of illustration one embodiment of the invention has been described, it is to be understood that the invention contemplates various modifications of the roughing tool and arbor which may be made by a skilled mechanic, to adapt the device to changing conditions, without departing from the spirit of the invention.

I claim:

1. A device for cutting a buttress-shaped groove in leather in such a manner that the perpendicular face of the groove will tend to overset towards the angular face to form in effect an undercut groove comprising a circular cutter, one side of each cutter being beveled to form a cutting edge on the periphery of the cutter, a plurality of teeth formed on the cutting edge, the entering face of said teeth being formed so as to provide a back rake on the beveled side of the teeth thereby providing an additional cutting edge.

2. A device for cutting a buttress-shaped groove in leather in such a manner that the perpendicular face of each groove will tend to overset towards the angular face to form in effect undercut grooves comprising an arbor and a plurality of circular cutters axially mounted on one extremity of the arbor to form a buffer, one side of each cutter being beveled to form a cutting edge of the periphery of the cutter, a plurality of teeth formed by serrating the cutting edge, the entering face of said teeth being formed so as to provide a back rake on the beveled side of the teeth thereby providing an additional cutting edge.

WILBURN R. YOUNG.